United States Patent
Cai et al.

(10) Patent No.: US 12,309,032 B2
(45) Date of Patent: May 20, 2025

(54) GEOGRAPHIC SCALING IN A CONTAINER BASED CLOUD INFRASTRUCTURE

(71) Applicant: TELEFONAKTIEBOLAGET LM ERICSSON (PUBL), Stockholm (SE)

(72) Inventors: Xuejun Cai, Täby (SE); Jinhua Feng, Bromma (SE); Srinivasa Vinay Yadhav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/036,115

(22) PCT Filed: Nov. 9, 2020

(86) PCT No.: PCT/EP2020/081516
§ 371 (c)(1),
(2) Date: May 9, 2023

(87) PCT Pub. No.: WO2022/096136
PCT Pub. Date: May 12, 2022

(65) Prior Publication Data
US 2023/0403198 A1  Dec. 14, 2023

(51) Int. Cl.
*H04L 41/0897* (2022.01)
*H04L 41/5025* (2022.01)
(Continued)

(52) U.S. Cl.
CPC ...... *H04L 41/0897* (2022.05); *H04L 41/5025* (2013.01); *H04L 43/0852* (2013.01); *H04L 67/52* (2022.05)

(58) Field of Classification Search
CPC ............. H04L 41/0897; H04L 41/5009; H04L 41/5041; H04L 41/5025; H04L 67/52; H04L 67/1008; H04L 43/0852
See application file for complete search history.

(56) References Cited

U.S. PATENT DOCUMENTS 11,128,699 B1 * 9/2021 Khurrum ............ G06F 9/45558
11,405,300 B2 * 8/2022 Kushmerick ........... H04L 43/16
(Continued)

OTHER PUBLICATIONS

International Search Report and Written Opinion dated Jul. 27, 2021 issued in International Patent Application No. PCT/EP2020/081516 (11 pages).
(Continued)

*Primary Examiner* — Jungwon Chang
(74) *Attorney, Agent, or Firm* — Rothwell, Figg, Ernst & Manbeck, P.C.

(57) ABSTRACT

The application relates to a method for operating a first scaling entity 100 of a container based cloud infrastructure distributed over a plurality of geographically distributed edge sites 20-22 of a network, wherein the container based cloud infrastructure provides at least one service to a user of the network, the method comprising: the step of determining at least one performance parameter influencing a performance how a first part of the container based cloud infrastructure provided on a first edge site of the plurality of edge sites where the first scaling entity is located provides the service to the user. Based on the determined at least one performance parameter, it is determined whether a scaling of the cloud infrastructure located on at least one other edge site of the plurality of geographically distributed edge sites outside the first edge site is necessary, wherein in the affirmative, an amendment of the container based cloud infrastructure is determined at the at least one other edge site which is configured to provide the service to the user. The determined amendment of the container cloud infrastructure is triggered at the at least one other edge site.

20 Claims, 7 Drawing Sheets

(51) Int. Cl.
  *H04L 43/0852* (2022.01)
  *H04L 67/52* (2022.01)

(56) References Cited

U.S. PATENT DOCUMENTS

| | | | |
|---|---|---|---|
| 2020/0275313 A1 | 8/2020 | He et al. | |
| 2021/0014133 A1* | 1/2021 | Maciocco | H04L 41/5009 |
| 2021/0051060 A1* | 2/2021 | Parvataneni | H04L 41/5041 |
| 2021/0058455 A1* | 2/2021 | Kozhaya | H04L 47/805 |
| 2021/0149745 A1* | 5/2021 | An | G06F 9/5083 |
| 2022/0329651 A1* | 10/2022 | Kim | H04L 67/1008 |

OTHER PUBLICATIONS

ETSI GS MEC 002 v1.4.2, Nov. 2017, "Multi-access Edge Computing (MEC); Technical Requirements", XP014302794 (54 pages).

T. Guo et al., "Providing Geo-Elasticity in Geographically Distributed Clouds", ACM Transactions on Internet Technology, vol. 18, No. 3, Article 38, Apr. 2018, https://doi.org/10.1145/3169794 (27 pages).

C. Guo et al., "Pingmesh: A Large-Scale System for Data Center Network Latency Measurement and Analysis", SIGCOMM, Aug. 17-21, 2015, DOI: http://dx.doi.org/10.1145/2785956.2787496 (14 pages).

R. Cox et al., "Practical, Distributed Network Coordinates", ACM SIGCOMM Computer Communication Review, 34(1) (6 pages), Jan. 2004.

R. Yu et al., "Survivable and Bandwidth-Guaranteed Embedding of Virtual Clusters in Cloud Data Centers (Extended Version)", arXiv:1612.06507v2 [cs.NI], Jan. 8, 2017 (11 pages).

* cited by examiner

GEOGRAPHIC SCALING IN A CONTAINER BASED CLOUD INFRASTRUCTURE

CROSS REFERENCE TO RELATED APPLICATIONS

This application is a 35 U.S.C. § 371 National Stage of International Patent Application No. PCT/EP2020/081516, filed Nov. 9, 2020.

TECHNICAL FIELD

The present application relates to a method for operating a first scaling entity of a container based cloud infrastructure. Furthermore, the corresponding first scaling entity is provided, a computer program comprising program code and a carrier comprising the computer program.

BACKGROUND

In recent years, there has been an increasing trend to deploy the cloud infrastructure into the mobile operator's 5G network in order to provide low latency or offload the data transferred in the backbone network for those applications which are latency sensitive or data intensive, e.g., AR/VR (Augmented Reality, Virtual Reality), gaming, auto-pilot vehicle, etc.

In a mobile network, the users may connect from any area in the network coverage area and request for the service deployed into the edge cloud. So usually the mobile operators need to deploy multiple geographic distributed edge cloud sites to provide wide area coverage. But the edge sites are usually small and have limited capability due to the cost and other limitation. Therefore, it is impossible to deploy the services from all tenants into all edge sites at the same time.

On the other hand, there has also been an increasing trend to deploy the edge service into container based cloud infrastructure, e.g., Kubernetes clusters. However, Kubernetes and many other container based cloud infrastructures do not provide good hard multi-tenancy support within one cluster at this moment. Therefore, in edge cloud environment, it is very likely that the support for multi-tenancy is through cluster separation, i.e., each tenant has their own Kubernetes clusters which are deployed into a set of selected edge sites. The multiple clusters of the same tenant then are federated into one federation to provide common configuration or deployment. But the idea described here can also apply to other type of edge cloud infrastructure.

As mentioned in the above section, the edge sites usually are small and have limited capability. The edge cloud operators cannot deploy a separate cluster for all tenants in every edge site. The clusters belonging to the same tenant can only be deployed into selected sites. However, the traffic characteristics of the users accessing the service provided by the tenant are always dynamic in the mobile network. In order to satisfy the SLAs (Service Level Agreements) or performance requirements of the services deployed for the tenant, the capacity of the clusters of the tenant shall be able to adjust to the dynamic traffic characteristics and the conditions of the network and cloud infrastructures. Many cloud providers or cloud environment can provide automated scaling of the cluster. For example, the open source project Cluster Autoscaler (https://github.com/kubernetes/autoscaler/tree/master/cluster-autoscaler) is such a tool that automatically adjusts the size of the Kubernetes cluster when one of the following conditions is true: there are Pods that failed to run in the cluster due to insufficient resources; there are nodes in the cluster that have been underutilized for an extended period of time and their Pods can be placed on other existing nodes.

However, firstly it is designed for the scaling of a single cluster. It is difficult to be applied into the multiple cluster scenario. In addition, even when considering to use a single cluster in edge environment and the nodes of the cluster span over multiple edge sites (or zones, term used by Cluster Autoscaler), it still has its limitations. Usually the motivation to scale the cluster is to satisfy the performance requirements for those services deployed in the tenant's cluster. The performance of many edge services (e.g., AR/VR) are mainly impacted by the latency, which is mainly determined by the proximity to the end user requesting the service. As the mobile user may request the edge service from any place in the network coverage area, just increasing the capacity of the existing clusters in the edge sites may not be able to meet the latency requirement to the service. It is more important for these edge services to increase the geographic coverage of these clusters. In Cluster Autoscaler the used node pool may contain the nodes from different geographic zones. However, it is not possible to specify the zone of new nodes to be joined into the cluster or the nodes to be removed during the scaling.

In "Providing Geo-Elasticity in Geographically Distributed Clouds" by Tian Guo and Prashant Shenoy. 2018. ACM Trans. Internet Technol. DOI:https://doi.org/10.1145/3169794, the authors propose a system that provides geo-elasticity by combining model-driven proactive and agile reactive provisioning approaches, the system can dynamically provision server capacity at any location based on workload dynamics. However, firstly, it uses a centralized system to monitor, profile the workload and decide if the servers allocated to the given application shall be deployed in a new location. The centralized way will introduce additional overhead for the communication and itself may has scalability issue. Secondly, the system mainly considered the workload towards the given application, it does not consider the impact of the network latency between the different locations and the latency between the servers and the access networks. Thirdly, it does not consider the multiple cluster scenarios.

Accordingly, there is a need to improve the scaling in situations where a container based cloud infrastructure is distributed over a plurality of geographically distributed edge sites.

SUMMARY

This need is met by the features of the independent claims. Further aspects are described in the dependent claims.

According to a first aspect a method for operating a first scaling entity of a container based cloud infrastructure is provided, wherein the infrastructure is distributed over a plurality of geographically distributed edge sites of a network, wherein the container based cloud infrastructure provides at least one service to a user of the network. According to one step of the method at least one performance parameter is determined influencing a performance how a first part of the container based cloud infrastructure provided on a first edge site of the plurality of edge sites where the first scaling entity is located provides the service to the user. Furthermore, it is determined based on the determined at least one performance parameter whether a scaling of the cloud infrastructure located on at least one other edge site of the plurality of geographically distributed edge sites outside the first edge site is necessary. In the affirmative, an amendment of the container based cloud infrastructure at the at least one other edge site which is configured to provide the service to the user is determined and the determined amendment of the container based cloud infrastructure is triggered at the at least one other edge site.

Furthermore, the corresponding first scaling entity located on the first edge site is provided which is configured to work as discussed above or as discussed in further detail below.

As an alternative a first scaling entity is provided which comprises a first module configured to determine at least one performance parameter influencing a performance how the first part of the container based cloud infrastructure provided on the first edge site of the plurality of edge sites where the first scaling entity is provided provides the service to the user. A second module is configured to determine, based on the at least one performance parameter, whether a scaling of the cloud infrastructure located on at least one other edge site of the plurality of edge sites outside the first edge site is necessary or not. In the affirmative, a third module determines an amendment of the container based cloud infrastructure at the at least one other edge site which is configured to provide the service to the user, and a fourth module is configured to trigger the determined amendment of the container based cloud infrastructure at the at least one other edge site.

The above discussed method and the corresponding scaling entity which is provided on one of the edge sites has the advantage that the scaling entity on the edge site can dynamically and automatically scale the container based infrastructure on other edge sites.

Additionally, a computer program comprising program code is provided, wherein execution of the program code causes at least one processing unit to carry out a method as discussed above or as discussed in further detail below.

Furthermore, a carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments, unless explicitly mentioned otherwise.

BRIEF DESCRIPTION OF THE DRAWINGS

The foregoing and additional features and effects of the application will become apparent from the following detailed description when read in conjunction with the accompanying drawings.

DETAILED DESCRIPTION

Figure 1:
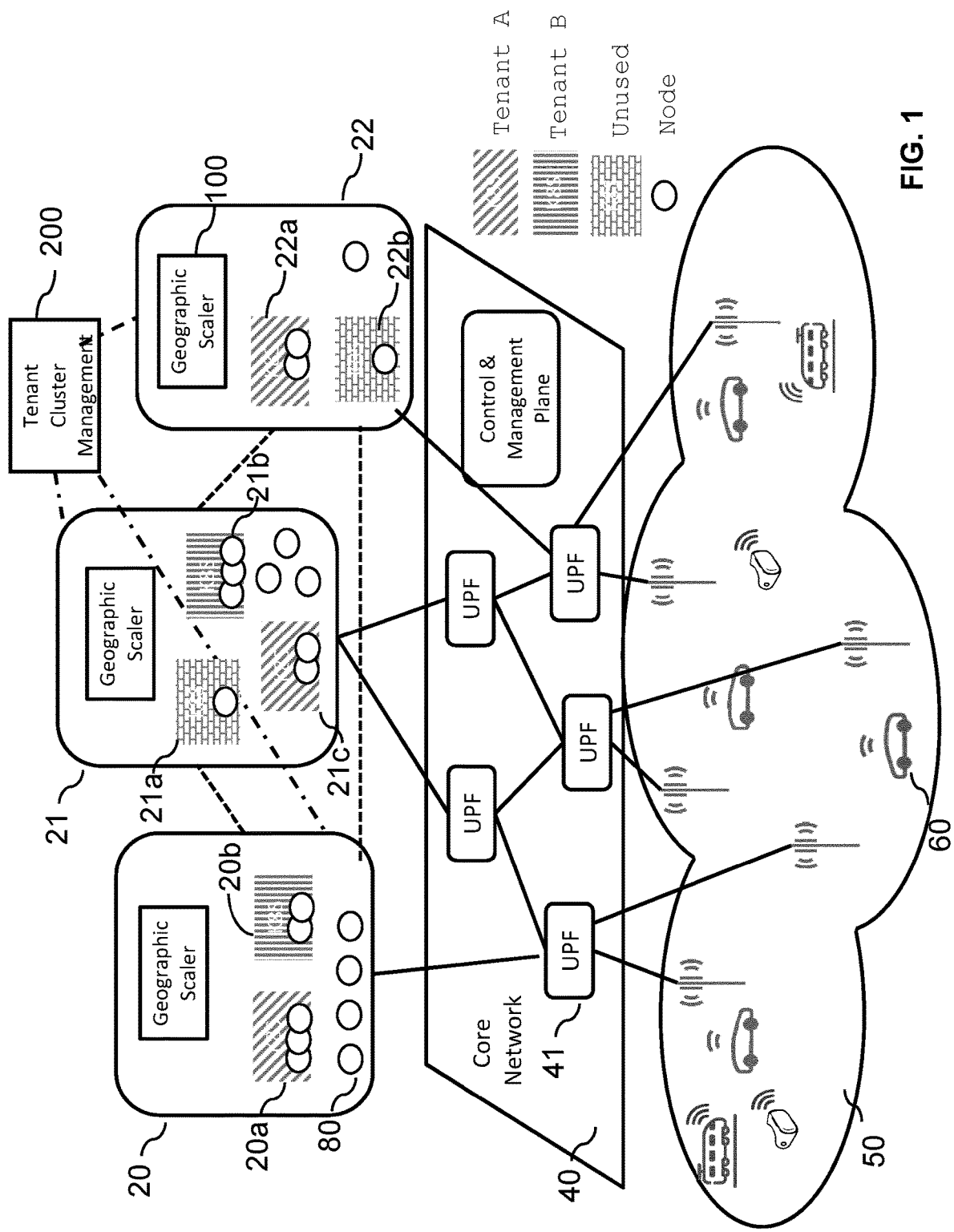
FIG. 1 shows a schematic architectural view of a container based cloud infrastructure in which a scaling entity on one of the edge sites determines the amendment of the container based cloud infrastructure.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

As will be discussed below, a system is provided which can automatically and dynamically scale the container based cloud infrastructure deployed in a distributed edge cloud environment. In the following the container based cloud infrastructure is explained in connection with a Kubernetes cluster; however, the idea described below can be applied to any other type of cloud based edge infrastructure.

The system, especially a scaling entity provided on one of the edge sites, can add or remove the cluster in different geographically located edge sites to or from the federated clusters according to the measured performance metrics from the network and the edge infrastructure. Furthermore, it is possible that the scaling entity only just triggers the adding and the removing.

As shown in FIG. 1, a container based cloud infrastructure is shown which is distributed over different edge sites 20, 21 or 22. The network shown is a cellular network comprising a core network 40 with different user plane functions 41 and a radio access network 50 in which different users use the cellular network. The different users 60 may use a certain service provided through the cellular network by application or service providers. The mobile network provides the connectivity to the edge sites, wherein the service is provided by the container based infrastructure provided on the different edge sites. The service and network provider could be the same provider, however they could also be different. In the embodiment shown each edge site comprises different clusters containing the container based infrastructure, wherein each cluster is held by a certain tenant. As shown in FIG. 1, cluster 20a is owned by tenant A and cluster 20b is owned by tenant B. Furthermore, each edge site may also contain unused clusters, as shown by cluster 21a or 22b. In the embodiment shown, the network is a cellular network, however it may also be implemented as a WLAN network.

In each of the edge sites a scaling entity 100 is provided, wherein the scaling entity is indicated as geographic scaler in the embodiment of FIG. 1. The clusters belonging to the same tenant form a multiple cluster environment in which the edge services provided by the service network are deployed. The scaling entity 100 provided on each of the edge sites monitors the metrics or event alarms, such as the cluster resource usage, the network latency or the requested throughput coming from either the network or the clusters deployed in the site. Based on these events or alarms and/or other information, for example the tenant's performance requirements, the characteristics of the traffic to or from the clusters, the local scaling policy, etc., the scaling entity will evaluate and decide if a geographic scaling shall be triggered, meaning that also the cloud infrastructure on other edge sites where the corresponding cluster is not located should be amended. Accordingly, geographic scaling means that the number of clusters belonging to the tenant will change and the clusters to be added or removed are from the plurality of distributed edge sites. If a geographic scaling is triggered, the scaling entity will communicate with the peer scaling entities on the other edge sites or a centralized scaling management entity or function is informed to select the best edge site in which the cluster will be added or removed. The decision can be sent to the corresponding edge sites to prepare and execute the scaling.

Figure 2:
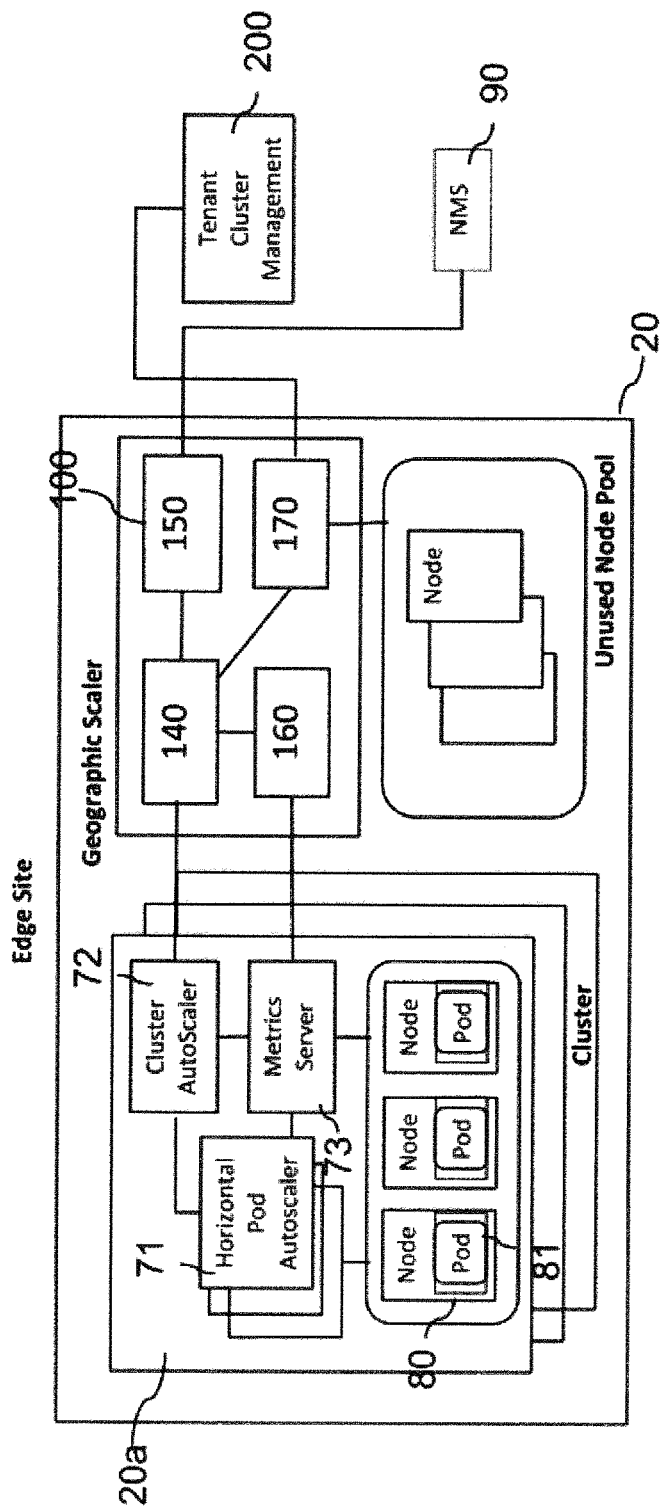
FIG. 2 is a more detailed view of the scaling entity and the edge site shown in FIG. 1.

FIG. 2 shows the main components of the scaling entity 100. As indicated above, the edge cloud environment comprises multiple geographically distributed edge sites, meaning small data centers deployed at the edge of the mobile network. In each edge site there are multiple nodes, wherein a node may be a virtual or physical machine. One or each of the clusters, such as cluster 20a, comprises one or more nodes 80. Each node contains the services necessary to run the Pods and is managed by a control plane. To provide multiple tenancy, there are multiple clusters running on each edge site and each cluster preferably belongs to one tenant. For each tenant, there are one or multiple clusters which are deployed in a selected set of edge sites and are federated to provide a common configuration or a deployment operation. In each edge site there is one scaling entity 100 which contains several components, the scaling controller 140, the network monitor 150, the cluster monitor 160 and the cluster manager 170. Furthermore, a centralized component, a tenant cluster management entity 200, is provided which could run on one of the edge sites or in a separate environment. Furthermore, a network management system, NMS, is provided. Furthermore each cluster can contain an autoscaler 71, a cluster autoscaler 72 and a metrics server 73.

The main functions of the scaling controller (SC) 140 include the installation of geographic scaling rules or policies for each tenant, receiving of events or alarms coming from the network monitor 150 and the cluster monitor 160, deciding whether to trigger a geographic scaling, selecting the edge site in which the cluster to be added or removed from the federated clusters of the tenants are located. The scaling controller 140 has an interface to the Cluster Autoscaler 72, which is a tool that automatically adjusts the size of a single cluster based on the resource requests of Pods running on this cluster. In the following this is referred to as local scaling.

The cluster monitor (CM) 160 is responsible for monitoring the performance metrics of the cluster and the applications deployed for the tenant. It is also responsible for generating the events or alarms according to the instruction from the scaling controller and the monitored performance metrics. The cluster monitor can collect the performance metrics from the related components. By way of example, in FIG. 2 the cluster monitor gets the performance metrics from the metrics server 73 in the cluster. It is also possible to get the metrics from other similar components deployed in the cluster or outside of the cluster. The performance metrics monitored by the cluster monitor can be related to the resource usage of the clusters, such as the number of unallocated Pods, the average processing or memory load of the cluster or the performance metrics related to the services deployed in the cluster, such as the request throughput or the round-trip delay. The cluster monitor could also monitor the traffic characteristics of the services, the source location of the user equipment, UEs, extracted from the history service requests.

The network monitoring (NM) 150 is responsible for monitoring the network performance between the edge site and the radio access networks and for generating the events or alarms according to these network performance metrics. The performance metrics may be measured by the network monitor itself either passively or actively. By way of example the network monitor can run the monitoring agents in each site to measure the latency between the edge sites and the network devices, such as the base stations in the mobile or cellular network, and the latency between peer edge sites. Other methods can also be used. Such metrics can also be retrieved from any other component in the edge or network, for example the network management system 90 of the mobile network.

The cluster manager (CluM) 160 is responsible for managing the clusters of the tenants in the edge site, for example to prepare to start or to stop a cluster. The tenant cluster management 200 is responsible for managing the clusters of the tenants, for example by creating the cluster federation, adding or removing a cluster from the federation of the tenant. One possible way is to interact with the control plane of a federated system if the multiple clusters of the same tenant are managed by the federated system.

Figure 3:
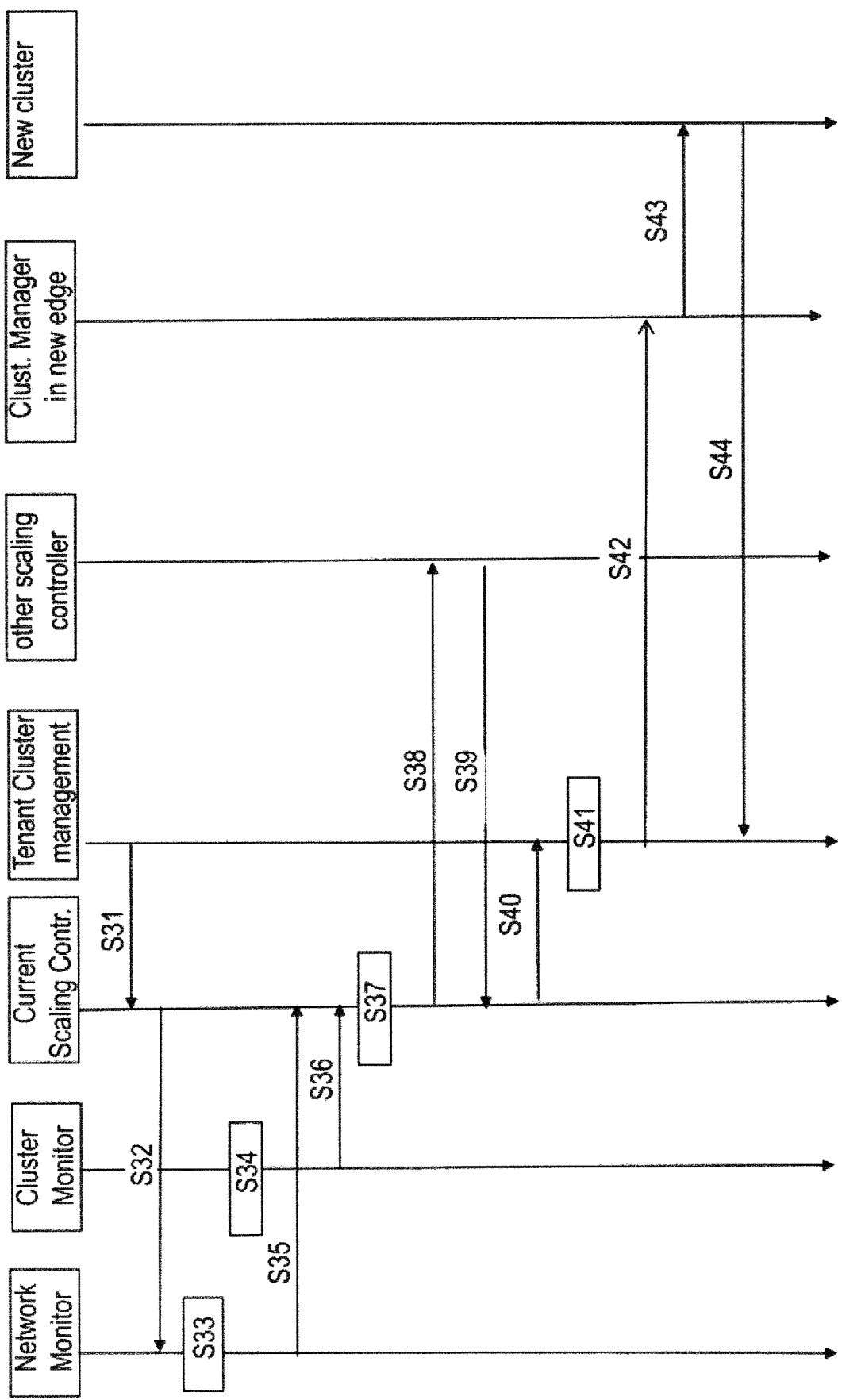
FIG. 3 shows a more detailed view of a message exchange between the entities involved for determining and triggering an amendment of the container based cloud infrastructure.

FIG. 3 shows a schematic message flow how the scaling entity is controlling the infrastructure provided for one or more services.

S31: When the TCM 200 is creating the federated clusters for the tenant, a scaling policy could be installed onto the first scaling entity, here the scaling controller (SC). The policy could include the information like the tenant name, the scaling action, the performance requirement (e.g., latency), the minimum and maximum number of nodes, the events that could trigger the scaling (e.g., the minimum number of unassigned Pods, or the average latency of the service requests being less than a given threshold), the local scaling policy for Cluster Autoscaler, the priority of the scaling scope (i.e., the local scaling or geographical scaling). The scaling action could be either scaling up or scaling down.

The scaling policy can also be installed or updated later.

S32: After receiving the scaling policy, the SC 140 shall check and analyze it, and send requests to CM 160 and NM 150 to subscribe the corresponding performance related events. For example, to ask the CM to report when the number of unassigned Pods in the cluster is greater than a predefined value or ask NM to report when the average network delay from the edge site to the radio access networks is larger than a threshold.

S33: The NM 150 shall also monitor the related network metrics either by itself or by retrieving the values provided by other functions in the mobile network, for example, the network management function.

S34: According to the subscription from the SC 140, the CM 160 shall monitor the related cluster metrics either by itself or by retrieving the values through other functions, for example, Metrics Server or Prometheus, running in the cluster.

S35/S36: If either the NM 150 or CM 160 has detected the events subscribed by the SC 140, it shall send the current event to the SC.

S37: After the reception of the events, the SC shall evaluate the event(s) to decide if a geographic scaling action will be triggered. The scaling evaluation can also be triggered by the Cluster Autoscaler when it determines that it cannot perform local scaling for some reason, for example, there is not enough available nodes in this edge site.

Such evaluation could take multiple information into consideration. For instance, the capacity of the current edge site, the various performance metrics, the performance requirements from the tenant, etc. Further below (FIG. 4), one example evaluation procedure is detailed.

S38: If the SC 140 has decided not to trigger a scaling action, it will just skip this event and do nothing; otherwise, if the scaling action is scaling up, the SC shall select an edge site among all available sites in the edge cloud environment by sending a query message to the SCs in other edge sites or to the TCM. Further below (FIG. 5), an example edge site selection is described.

S39: The SC shall check the responses from other SCs or TCM to see if any of them is positive, i.e., there are available resources in other edge sites that satisfy the scaling action and corresponding requirements.

S40: If there is a positive response, the SC 140 shall send a scaling request to the TCM 200, in which the type, requirement, the candidate edge site, etc. are included.

S41: The TCM 200 shall check the request and all the related information to decide whether the scaling request is to be accepted.

S42: If the decision is to accept, the TCM 200 shall send a request to the Cluster Manager in the designated edge site; if the decision is to reject, the TCM shall send back a response to the SC to indicate the decision.

S43: The Cluster Manager could create a new cluster or assign an initiated but unused cluster in that edge site to that tenant.

S44: The Cluster Manager could send a response to TCM with the information and new cluster. And then the new cluster can ask the TCM to let it join the cluster federation of the tenant.

In the flowchart of FIG. 3 a differentiation was made between the different functional units in the scaling entity, such as the network monitor, the cluster monitor or the scaling controller. However, it should be understood that the different functional entities might be implemented in a different amount of functional entities or in a single entity.

Figure 4:
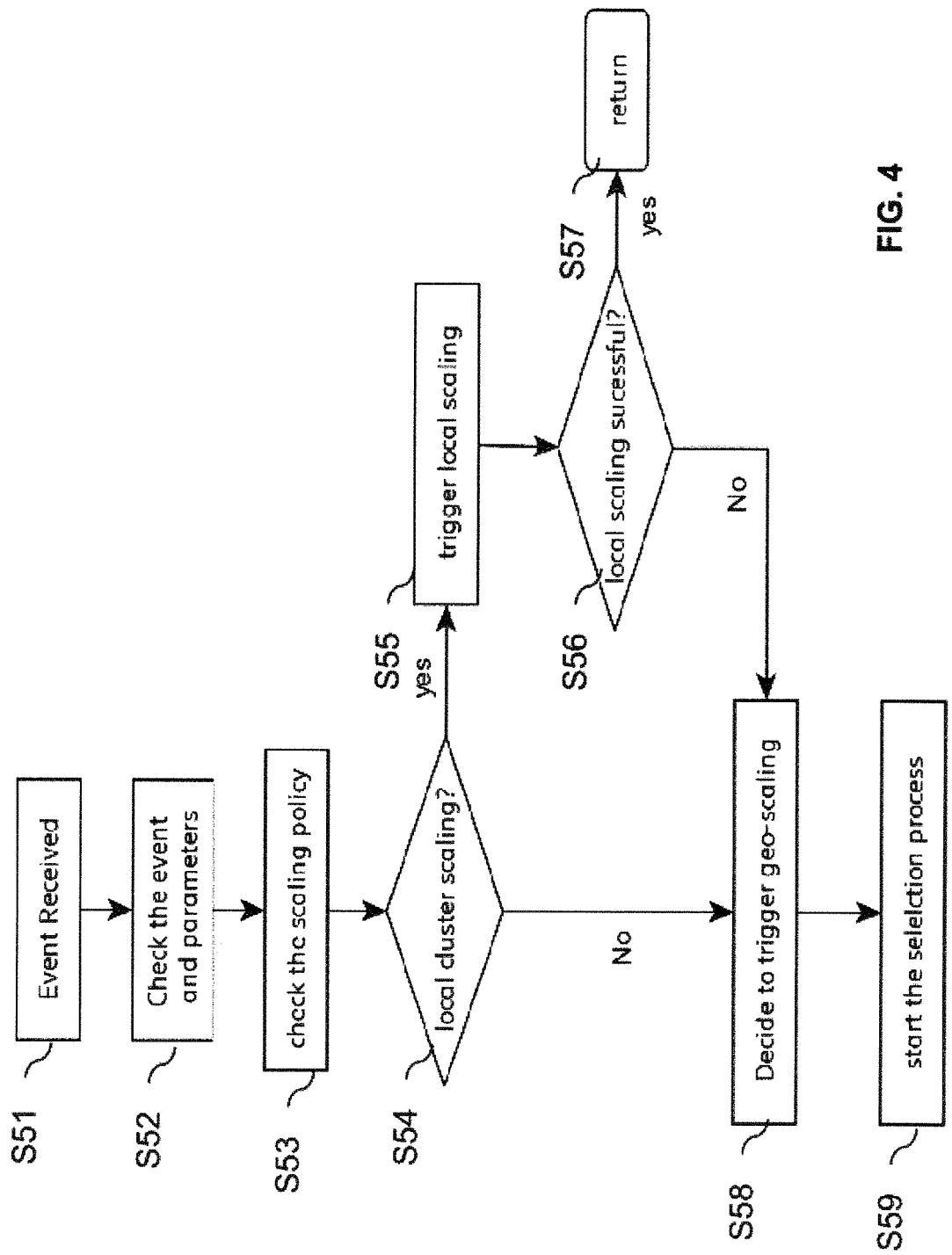
FIG. 4 shows an example flowchart of a method carried out by the scaling entity for evaluating whether a local or global scaling is necessary.

In FIG. 4 a scaling event evaluation procedure is depicted.

The scaling event could contain the ClusterName, the EventType and the corresponding parameters, for example,
<ClusterName: 'foo', Type: UnsignedPodExceedThreshold, Threshold: 5, PodNumber: 8>,
which means that the current number of unassigned Pods is 8 and already exceeds the predefined threshold 5.

A further list of some other potential scaling event types:
ClusterOverload (e.g., triggered when the average CPU load of all nodes are greater than the predefined threshold: e.g. 90%)
ClusterUnderload (e.g., triggered when the average CPU load of all nodes are less than the predefined threshold: e.g. 10%)
AverageServiceRoundtripTooHigh (e.g., triggered when the average round-trip latency for application A is higher than the predefined threshold e.g. 20 ms)

After a scaling event is received from the CM in step S51, the SC shall check the event, the parameters (S52), the scaling policy and related information (S53). As mentioned above, the scaling policy can specify the scaling action (i.e., scaling up or down), the priority of the scaling scope (local or geographical).

In this example, the scaling action for this event is scaling up and the local scaling has higher priority than geographic scaling (S54). So the SC will trigger the local scaling (S55) of the cluster Too', and send a local scaling request to the corresponding function, i.e., the Cluster Autoscaler in the cluster. If the local scaling can be performed successfully (S56), the SC will have no further action and continue to listen on the scaling events (S57) and thus return to step S51. If for some reason, the local scaling cannot be done, for example, if there are not enough local resources (i.e., free nodes) in this edge site, the SC then decides to trigger the geographical scaling (S58) and starts the process (see the following section) to select an appropriate edge site as the potential place to host the new cluster for the current tenant (S59).

Suppose another type of event (AverageServiceRoundtripTooHigh) is received by the Scaling Controller and it indicates that the average round trip latency in the last hour for a specific application has exceed the predefined threshold (i.e., 20 ms). The Scaling Controller could check the distribution of the source locations of the received user requests and the network latency between those locations and the current edge site. If it is shown that the round-trip latency is mainly introduced by the high network latency between the source locations and the edge site, the Scaling Controller decides to trigger a geographic scaling because local scaling will not improve the round trip latency.

If the Scaling Controller receives an event (ClusterUnderload), which indicates the average load of all nodes are lower than the predefined threshold 10%, it can trigger a geographic scaling down decision according to the installed scaling policy.

After the SC 140 has decided to trigger a geographical scaling, then it should start a selection process to find the suitable edge sites to host the new cluster. In general, such selection would be based on multiple factors, for example:
the requirements on the new clusters;
the current network conditions (e.g., the latency to the current site or to the mobile network) of other candidate edge sites;
the resource usages (e.g., free CPU/memory capacities, available hardware accelerators) of other candidate edge sites.

Firstly, the SC 140 needs to calculate the requirements for the new cluster (in scaling up case) according to multiple information, the following information is an example:
the scaling event (e.g., the number and the type of unassigned Pods);
the metrics measured by the CM 160 and NM 150 (e.g., the network latency, the location distribution of the users which have accessed the service deployed in the current cluster);
the performance requirements for the services deployed by the tenant in the edge environment.

The calculated requirements basically can contain two aspects:
- the compute resource, i.e., the requirements on the compute capacity of the nodes, e.g., CPU/memory/storage capacity;
- the geographic requirement, for example, the average round-trip latency to a specify access network area.

In the case of the scaling down decision, the Scaling Controller 140 needs to check if there are other edge sites that can take over the existing user requests in the current edge site and can satisfy the performance requirements of those deployed services. The selection process is similar to the scaling up case, except the selected edge sites are used to migrate existing user requests. If there are available edge sites, the SC will trigger a scaling down, i.e., to migrate existing user requests to other edge sites, remove the cluster from the multi-clusters for this tenant, shutdown the cluster and release the nodes in the cluster.

In the following examples, the procedure of the selection in the case of scaling up is described.

Once the requirements on the new cluster (i.e., the nodes comprising it) are calculated, the SC 140 shall start the selection process. Such process could be performed in a centralized way or in a distributed way. In centralized way, there is a central function, for example, the TCM need to monitor the status of all edge sites, and then select the edge sites that can satisfy the scaling requirements. In distributed way, there is no central function, the SC in one edge site need to communicate with the SCs in other edge sites to determine the suitable candidate edge sites. Each way has its cons and pros.

Figure 5:
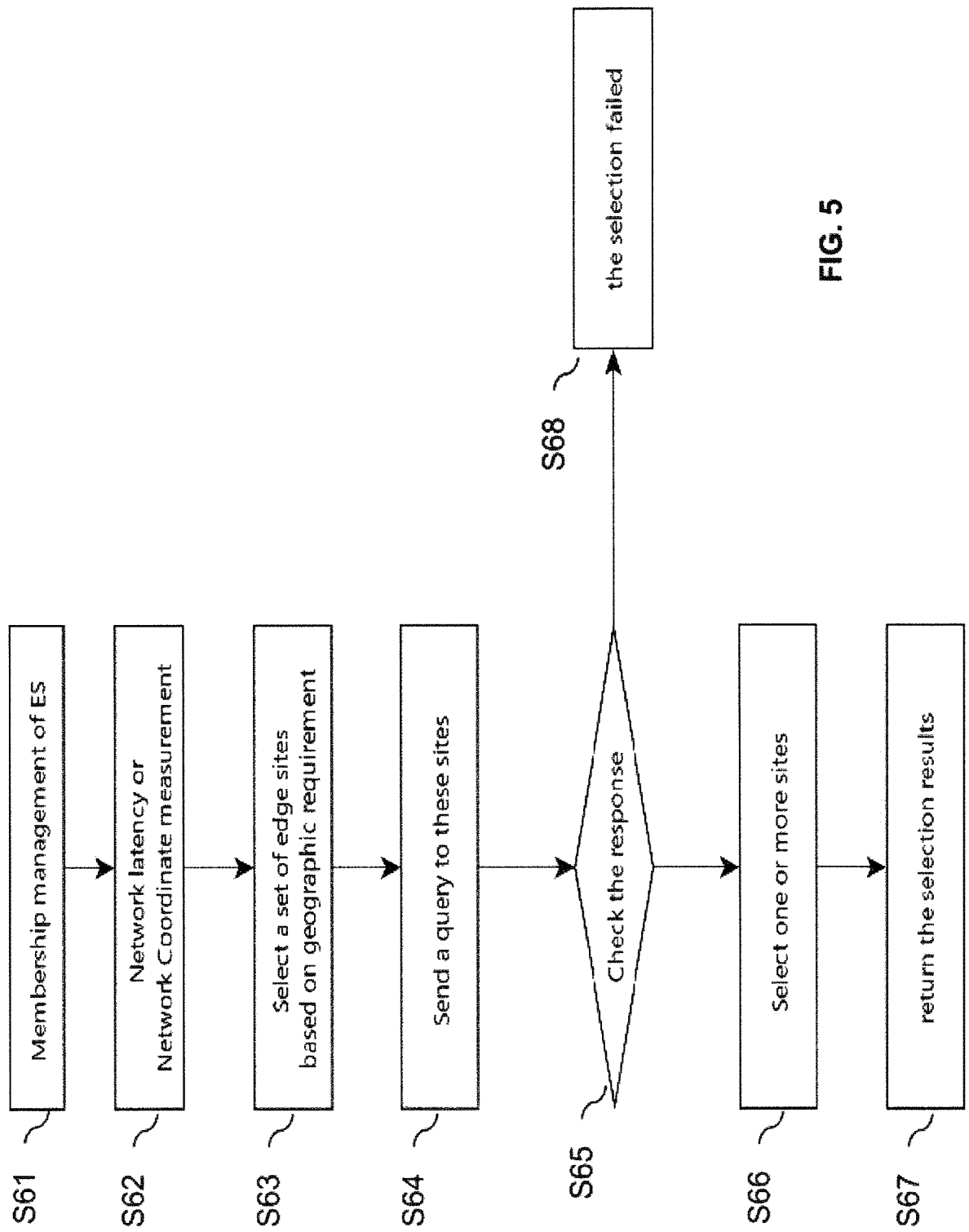
FIG. 5 shows an example flowchart of a method carried out by the scaling entity for selecting other edge sites for the amendment of the container based cloud infrastructure.

FIG. 5 depicts an example distributed selection process.

Before the selection, the SC 140 in each edge site can establish group membership with each other (S61), i.e., to know other SCs in the environment. Such membership could be established manually or automatically through some distributed protocol, e.g., peer to peer, or gossip protocol, etc.

The SCs could measure the network latency between each other (S62). One lightweight method to measure and calculate the latency between any two nodes is to use network coordinates system, e.g., Vivaldi system. The SCs can also measure or collect the network latency between them and the access networks via the Network Monitor or other tools like Pingmesh.

Now based on the scaling requirements and the latencies calculated in the previous step, the SC could select a set of edge sites from the group (S63) and send a query (S64). When the number of the edge sites is small, the SC could simply select all edge sites in the environment. But if there are lots of edge sites, it is better to only select some sites according to designated criteria in order to reduce the additional overhead. There are multiple options to select the edge sites to be queried. For example, the geographic requirement could be that the new cluster shall be close to the current one. The SC shall select several (e.g., 3) edge sites that have the lowest delay to the current edge site. If the geographic requirement is that the new cluster shall be close to some specific network areas, the SC shall select several edge sites that have the lowest latency to those network areas.

Then the SC 140 send a query to the SCs in the set of the edge sites. In the query, other requirements, e.g., the compute requirement are included.

After receiving the query, other SCs shall send a response to indicate if the requirements can be satisfied and other relevant information, e.g., the capability of the available nodes, etc.

The SC shall check all the responses (S65). If there is no positive response from other SCs, the SC can return from this process and indicate the scaling has failed (S68). It can also choose to send the query to all other SCs in the group. If there are positive responses, the SC shall select one or more edge sites according to some pre-defined rules (S66), for example, the SC can select the edge site that has the lowest average latency to the mobile networks. The SC then triggers the scaling by sending a message to TCM as described in FIG. 3.

Figure 6:
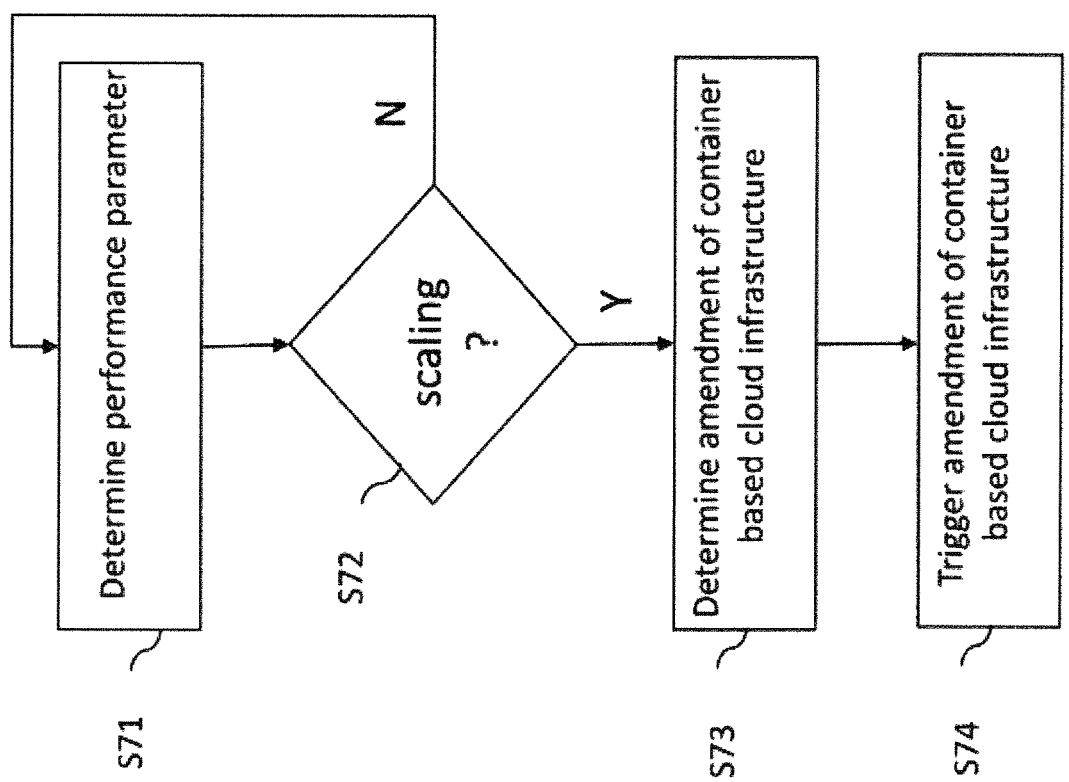
FIG. 6 shows another example flowchart of a method carried out by the scaling entity for operating the scaling entity when operating as discussed above in connection with FIGS. 2 to 5.

FIG. 6 summarizes some of the steps carried out by the scaling entity 100 in the situations discussed above.

In step S71 the scaling entity 100 determines a performance parameter of the container based infrastructure which is provided on the edge site where the scaling entity is located. As indicated in connection with FIG. 3, the scaling entity can use network parameters and the parameters of the cluster or container based infrastructure on the site to determine the performance of the infrastructure. In step S72, based on the performance parameters and the performance requirements provided for the corresponding service, it is determined whether a scaling of the infrastructure outside the current site is necessary or not. If this is not necessary, it is optional to check whether a local scaling is necessary. If this is not the case, the performance parameter can be continuously checked and monitored. If it is determined in step S72 that a scaling, especially a geographical scaling, is necessary, an amendment of the container based cloud infrastructure is determined in step S73 for at least one other edge site which also provides the same service to the user or the same services for which the performance parameter was determined in step S71 for the corresponding processing hardware and network infrastructure. In step S74 the amendment of the container based cloud infrastructure is then triggered, meaning that either the other scaling entities are directly instructed how to amend the corresponding infrastructure at the corresponding site, or a central entity, such as the tenant cluster manager 200, may be asked to coordinate the newly determined infrastructure as determined by the scaling entity provided on the site where the performance parameter was determined.

Figure 7:
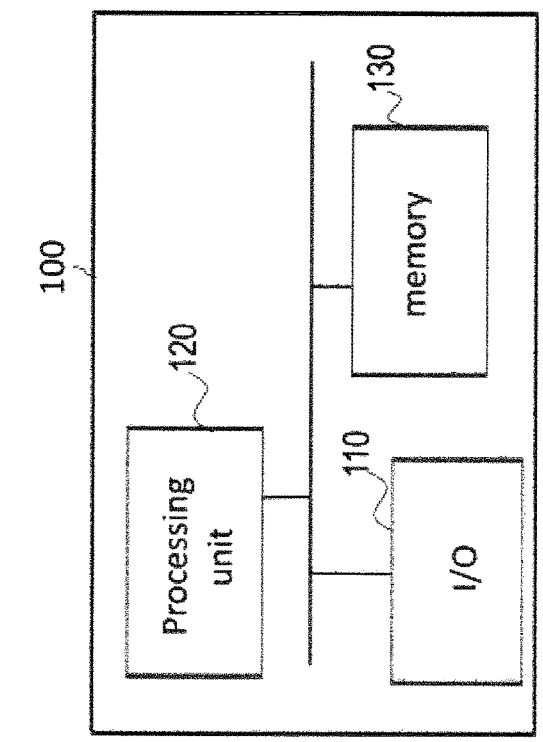
FIG. 7 shows an example schematic representation of the scaling entity used in the architecture of FIG. 1 and which is configured to determine an amendment of the container based cloud infrastructure on other edge sites.

FIG. 7 shows a schematic architectural view of the scaling entity 100 provided on one of the edge sites. The scaling entity 100 comprises an interface 110 configured to receive user data or control messages from other entities and configured to transmit user data or control messages to other entities. The interface 110 may be configured to send out the queries to the other scaling entities, may be configured to receive the responses and provide the required information to the new edge site. The scaling entity 100 furthermore comprises a processing unit 120 which is responsible for the operation of the scaling entity. The processing unit 120 can comprise one or more processors and can carry out instructions stored on a memory 130, wherein the memory may include a read-only memory, a random access memory, a mass storage, a hard disk or the like. The memory can furthermore include a suitable program code to be executed by the processing unit 120 so as to implement the above-described functionalities in which the scaling entity is involved.

It should be understood that the scaling entity 100 may not be implemented as one isolated physical node, but the processing unit and the memory may be arranged in a plurality of physically separated nodes arranged in the cloud. Accordingly, the infrastructure shown in FIG. 7 may be a virtualized infrastructure.

Figure 8:
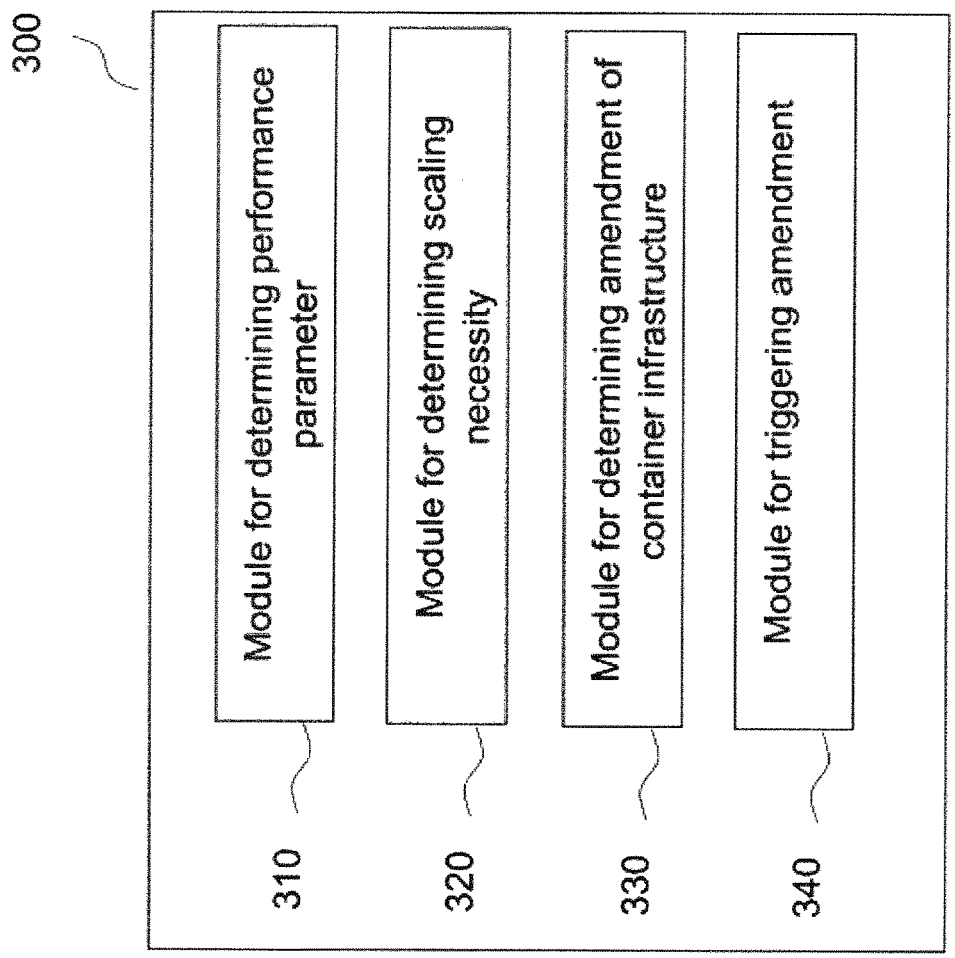
FIG. 8 shows another example schematic representation of the scaling entity shown in FIG. 7.

The same is true for FIG. 8, which shows another schematic architectural view of a scaling entity 300. The scaling entity 300 comprises a first module configured to determine the performance parameter of the cloud based infrastructure provided on the site where the entity 300 is provided. A module 320 is provided configured to determine whether a scaling is necessary based on the determined performance parameter. A module 330 is provided configured to determine the amendment of the container based cloud infrastructure on the at least one other edge site and module 340 is provided to trigger the amendment of the container based cloud infrastructure at least one other edge site.

From the above said some general conclusions can be drawn.

For determining the performance parameter, the scaling entity may determine at least one site performance parameter which describes in general a processing performance of the first part of the container based cloud infrastructure on the first site, especially the performance parameter of the service running on the edge site. Furthermore, at least one network performance parameter describing the transmission performance of data exchanged between the first site and other parts of the cellular network may be determined, and the amendment of the container based cloud infrastructure at the at least one other edge site can be determined based on at least one of the site performance parameter and the network performance parameter.

If a value of the at least one site performance parameter or a value of the network performance parameter or both of them are outside a corresponding range, an event can be detected at the scaling entity and the event can be evaluated in order to determine whether an amendment of the container based cloud infrastructure at the other edge site is necessary. As discussed in connection with FIG. 4, different events relating to the site performance such as cluster overload or underload or network parameters such as a round-trip time can be determined, and based on the outcome a scaling at the other edge site or edge sites may be triggered.

Furthermore, it is possible that the scaling of the cloud infrastructure at at least one other edge site is only necessary if an amendment of the container based cloud infrastructure in the first edge site itself is not sufficient to meet predefined performance requirements for the service.

Accordingly, as discussed in connection with FIG. 4, if a local scaling is not sufficient, the geographical scaling may be implemented.

When it is determined that an amendment of the container based cloud infrastructure in at least one other edge site is necessary, at least one other entity located outside the first edge site may be queried whether the amendment of the container based cloud infrastructure is possible at the other edge sites of the plurality of geographically distributed edge sites. The amendment of the container based cloud infrastructure in the at least one other edge site may then be determined based on the responses received from the at least one other entities located outside the first edge site in response to the query. The query may be sent to the other scaling entities on the other edge sites directly or may be sent to the tenant cluster manager.

When the determined amendment of the infrastructure is triggered, a central management entity such as the tenant cluster manager 200 configured to manage the container based infrastructure on the plurality of distributed edge sites may be contacted in order to inform that the container based cloud infrastructure should be amended at the at least one other edge site as determined by the first scaling entity. The scaling entity can furthermore comprise a scaling policy indicating an amendment of the container based cloud infrastructure on the first edge site and on the other edge sites outside the first edge site in dependence on the at least one performance parameter and in dependence on performance requirements for the service. The amendment of the container based cloud infrastructure and the at least one other edge site can then be determined based on the scaling policy and the determined at least one performance parameter.

Furthermore, it is possible that based on the events and the scaling policy it is determined whether a scaling of the first part of the container based infrastructure at the first edge site is enough or not. When it is determined that the scaling of the infrastructure at the first edge site is not enough, the amendment of the container based cloud infrastructure in the at least one other edge site is determined.

The scaling entity can comprise a scaling control module 140 or a scaling controller determining the amendment of the container based cloud infrastructure, a network monitoring module 150 determining at least one network performance parameter describing the network performance between the first edge site and the network, a cluster monitoring module 170 determining at least one site performance parameter describing the processing performance of the first part of the container based cloud infrastructure on the first edge site. The scaling control module then determines the amendment of the container based cloud infrastructure based on the at least one network performance parameter determined by the network monitoring module and based on the at least one site performance parameter determined by the cluster monitoring module.

The scaling control module 140 may furthermore receive a scaling policy indicating the amendment of the container based cloud infrastructure on the first edge site and on the other edge sites outside the first edge site in dependence on the at least one performance parameter and in dependence on performance requirements for the service. The scaling control module can subscribe to performance related events generated at the network monitoring module and the cluster monitoring module in order to determine whether the scaling of the cloud based infrastructure located on the at least one other edge site is necessary.

Furthermore, it is possible to select at least one other edge site from the plurality of geographically distributed edge sites based on the following pieces of information:
- a processing capacity for providing the service provided on the different geographically distributed edge sites,
- the network conditions for the transmission of data between the first edge site and the network,
- and a total necessary amendment of the container based cloud infrastructure in order to meet predefined performance requirements for the service.

When the scaling is an upscaling, the determining of the amendment of the container based cloud infrastructure can comprise the following steps:
- determining performance requirements for the new container based cloud infrastructure to be added to the total container based cloud infrastructure, the step of determining a network latency for the communication between the network and the other of the plurality of distributed edge sites. Furthermore, a first set of edge sites may be selected from the other of the plurality of distributed edge sites and a query may be transmitted to each of the first set of edge sites including the performance requirements. The at least one other edge site can then be selected from the first set of edge sites based on the responses received in response to the queries. This was discussed above in more detail in connection with FIG. 5.

In summary, in a geographically distributed edge cloud environment in which the tenant run-time comprises multiple clusters the solution discussed above can dynamically and automatically scale the multi-cluster in a geographic way, so that the problem can be solved of existing methods which only scale the allocated resources in the already given locations. The geographical auto-scaling may be performed automatically in a distributed or in a centralized way and the invention can help to fulfill the performance requirements, especially any latency related requirements, from the tenants.

The invention claimed is:

1. A method for operating a first scaling entity of a container based cloud infrastructure distributed over a plurality of geographically distributed edge sites of a network, wherein the container based cloud infrastructure provides at least one service to a user of the network, the method comprising:
   determining at least one performance parameter influencing a performance how a first part of the container based cloud infrastructure provided on a first edge site of the plurality of edge sites where the first scaling entity is located provides the service to the user,
   determining, based on the determined at least one performance parameter, whether a scaling of the cloud infrastructure located on at least one other edge site of the plurality of geographically distributed edge sites outside the first edge site is necessary, wherein in the affirmative:
   determining an amendment of the container based cloud infrastructure at the at least one other edge site which is configured to provide the service to the user, and
   triggering the determined amendment of the container cloud infrastructure at the at least one other edge site, wherein the at least one determined performance parameter includes network latency; and
   wherein the first scaling entity comprises a geographic scaling policy indicating an amendment of the container based cloud infrastructure on the first edge site and on the other edge sites outside the first edge site in dependence on the network latency and in dependence on performance requirements for the service, wherein the amendment of the container based cloud infrastructure in the at least one other edge site is determined based on the geographic scaling policy and the network latency.

2. The method according to claim 1, wherein determining the at least one performance parameter comprises determining at least one site performance parameter describing a processing performance of the first part of the container based cloud infrastructure on the first edge site and determining at least one network performance parameter describing a transmission performance of data exchanged between the first edge site and other parts of the cellular network, wherein the amendment of the container based cloud infrastructure at the at least one other edge site is determined based on at least one of the at least one site performance parameter and the at least one network performance parameter.

3. The method according to claim 2, wherein, if a value of the at least one site performance parameter is outside a first range and/or when a value of the network performance parameter is outside a second range, a corresponding event is detected at the first scaling entity, wherein the event is evaluated in order to determine whether an amendment of the container based cloud infrastructure at the at least one other edge site is necessary.

4. The method according to claim 3, wherein based on the events and the scaling policy it is determined whether a scaling of the first part of the container based infrastructure at the first edge site is enough, wherein, when it is determined that the scaling of the infrastructure at the first edge site is not enough, the amendment of the container based cloud infrastructure in the at least one other edge site is determined.

5. A computer program product comprising a non-transitory computer readable medium comprising program code to be executed by at least one processing unit of a first scaling entity, wherein execution of the program code causes the at least one processing unit to carry out a method according to claim 1.

6. The method according to claim 1, wherein it is only determined that the scaling of the cloud infrastructure at at least one other edge site is necessary if an amendment of the container based cloud infrastructure in the first edge site is not sufficient to meet predefined performance requirements for the service.

7. The method according to claim 6, wherein determining an amendment of the container based cloud infrastructure in the at least one other edge site comprises querying at least one other entity located outside the first edge site whether the amendment of the contained based cloud infrastructure is possible at other edge sites of the plurality of geographically distributed edge sites, wherein the amendment of the container based cloud infrastructure in the at least one other edge site is determined based on the responses received from the at least one other entities located outside the first edge site in response to the query.

8. The method according to claim 1, wherein triggering comprises requesting a central management entity configured to manage the container based infrastructure on the plurality of distributed edge sites to amend the container based cloud infrastructure in the at least one other edge site as determined by the first scaling entity.

9. The method according to claim 1, wherein the first scaling entity comprises a scaling policy indicating an amendment of the container based cloud infrastructure on the first edge site and on the other edge sites outside the first edge site in dependence on the at least one performance parameter and in dependence on performance requirements for the service, wherein the amendment of the container based cloud infrastructure in the at least one other edge site is determined based on the scaling policy and the determined at least one performance parameter.

10. The method according to claim 1, wherein the first scaling entity comprises a scaling control module determining the amendment of the container based cloud infrastructure, a network monitoring module determining at least one network performance parameter describing a network performance between the first edge site and the network, a cluster monitoring module determining at least one site performance parameter describing a processing performance of the first part of the container based cloud infrastructure on the first edge site, wherein the scaling control module determines the amendment of the container based cloud infrastructure based on the at least one network performance parameter determined by the network monitoring module and based on the at least one site performance parameter determined by the cluster monitoring module.

11. The method according to claim 10, wherein the scaling control module receives a scaling policy indicating an amendment of the container based cloud infrastructure on the first edge site and on the other edge sites outside the first edge site in dependence on the at least one performance parameter and in dependence on performance requirements for the service, wherein the scaling control module subscribes to performance related events generated at the network monitoring module and the cluster monitoring module in order to determine whether the scaling of the cloud based infrastructure located on the at least one other edge site is necessary.

12. The method according to claim 1, further comprising the step of selecting the at least one other edge site from the plurality of geographically distributed edge sites based on at least one of the following:
 a processing capacity for providing the service provided on the plurality of geographically distributed edge sites,
 network conditions for the transmission of data between the first edge site and the network, and/or
 a total necessary amendment of the container based cloud infrastructure in order to meet defined performance requirements for the service.

13. The method according to claim 1, wherein the scaling is an upscaling and determining an amendment of the container based cloud infrastructure comprises:
 determining performance requirements for a new container based cloud based infrastructure to be added to the container based cloud infrastructure,
 determining a network latency for a communication between the network and the other of the plurality of distributed edge sites,
 selecting a first set of edge sites from the other of the plurality of distributed edge sites,
 transmitting a query to each of the first set of edge sites including the performance requirements, and
 selecting the at least one other edge site from the first set of sites based on responses received in response to the queries.

14. A first scaling entity of a container based cloud infrastructure distributed over a plurality of geographically distributed edge sites of a network, the first entity being configured to:
 determine at least one performance parameter influencing a performance how a first part of the container based cloud infrastructure provided on a first edge site of the plurality of edge sites where the first scaling entity is located provides the service to the user,
 determine, based on the determined at least one performance parameter, whether a scaling of the cloud infrastructure located on at least one other edge site of the plurality of geographically distributed edge sites outside the first edge site is necessary, wherein in the affirmative:
 determine an amendment of the container based cloud infrastructure at the at least one other edge site which is configured to provide the service to the user, and
 trigger the determined amendment of the container based cloud infrastructure at the at least one other edge site,
 wherein the at least one determined performance parameter includes network latency; and
 wherein the first scaling entity comprises a geographic scaling policy indicating an amendment of the container based cloud infrastructure on the first edge site and on the other edge sites outside the first edge site in dependence on the network latency and in dependence on performance requirements for the service, wherein the amendment of the container based cloud infrastructure in the at least one other edge site is determined based on the geographic scaling policy and the network latency.

15. The first scaling entity according to claim 14, further being configured, for determining the at least one performance parameter, to determine at least one site performance parameter describing a processing performance of the first part of the container based cloud infrastructure on the first edge site and determining at least one network performance parameter describing a transmission performance of data exchanged between the first edge site and other parts of the network, wherein the amendment of the container based cloud infrastructure at the at least one other edge site is determined based on at least one of the at least one site performance parameter and the at least one network performance parameter.

16. The first scaling entity according to claim 15, further being configured, if a value of the at least one site performance parameter is outside a first range and/or when a value of the network performance parameter is outside a second range, to detect a corresponding event at the first scaling entity and to evaluate the event in order to determine whether an amendment of the container based cloud infrastructure at the at least one other edge site is necessary.

17. The first scaling entity according to claim 14, further being configured to only determine that the scaling of the cloud infrastructure at at least one other edge site is necessary if an amendment of the container based cloud infrastructure in the first edge site is not sufficient to meet predefined performance requirements for the service.

18. The first scaling entity according to claim 17, further being configured, for determining an amendment of the container based cloud infrastructure, to query at least one other entity located outside the first edge site whether the amendment of the container based cloud infrastructure is possible at other edge sites of the plurality of geographically distributed edge sites, and to determine the amendment of the container based cloud infrastructure in the at least one other edge site based on the responses received from the at least one other entities located outside the first edge site in response to the query.

19. The first scaling entity according to claim 14, further being configured, for triggering, to request a central management entity configured to manage the container based infrastructure on the plurality of distributed edge sites to amend the container based cloud infrastructure in the at least one other edge site as determined by the first scaling entity.

20. The first scaling entity according to claim 14, further comprising a scaling policy indicating an amendment of the container based cloud infrastructure on the first edge site and on the other edge sites outside the first edge site in dependence on the at least one performance parameter and in dependence on performance requirements for the service, the first scaling entity being configured to determine the amendment of the container based cloud infrastructure in the at least one other edge site based on the scaling policy and the determined at least one performance parameter.

* * * * *